United States Patent
Collins et al.

(10) Patent No.: US 10,471,941 B2
(45) Date of Patent: Nov. 12, 2019

(54) POWER CAPTURE DURING A LINE LOCK EVENT

(71) Applicant: Ford Global Technologies, LLC, Dearborn, MI (US)

(72) Inventors: Patrick Gordon Collins, Canton, MI (US); Duane M. Grider, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 403 days.

(21) Appl. No.: 15/404,288

(22) Filed: Jan. 12, 2017

(65) Prior Publication Data

US 2018/0194340 A1    Jul. 12, 2018

(51) Int. Cl.
| | | |
|---|---|---|
| *B60T 8/26* | (2006.01) | |
| *B60T 8/17* | (2006.01) | |
| *B60T 8/1761* | (2006.01) | |
| *B60T 13/66* | (2006.01) | |
| *B60K 6/48* | (2007.10) | |
| *B60W 10/08* | (2006.01) | |
| *B60W 30/18* | (2012.01) | |
| *B60W 20/15* | (2016.01) | |

(52) U.S. Cl.
CPC .............. *B60T 8/26* (2013.01); *B60K 6/48* (2013.01); *B60T 8/17* (2013.01); *B60T 8/17616* (2013.01); *B60T 13/662* (2013.01); *B60W 10/08* (2013.01); *B60W 20/15* (2016.01); *B60W 30/18172* (2013.01); *B60K 2006/4825* (2013.01); *B60T 2270/602* (2013.01)

(58) Field of Classification Search
None
See application file for complete search history.

(56) References Cited

U.S. PATENT DOCUMENTS

| | | | | |
|---|---|---|---|---|
| 4,345,672 A | * | 8/1982 | Nakasu | B60T 13/581 137/806 |
| 4,812,671 A | * | 3/1989 | Furrow | B60T 7/107 123/333 |
| 4,840,157 A | * | 6/1989 | Furrow | F02D 31/009 123/1 A |
| 5,652,468 A | * | 7/1997 | Reid | B60R 16/03 307/10.1 |
| 5,707,117 A | * | 1/1998 | Hu | B60G 17/0185 180/197 |
| 5,722,293 A | * | 3/1998 | McFadden | F16H 59/04 477/80 |
| 5,781,869 A | * | 7/1998 | Parlett, Jr. | G01P 15/036 307/10.1 |
| 5,794,739 A | * | 8/1998 | Ring | B60T 13/581 188/153 R |

(Continued)

*Primary Examiner* — Nicholas K Wiltey (74) *Attorney, Agent, or Firm* — David Kelley; Brooks Kushman P.C.

(57) ABSTRACT

A vehicle includes a powertrain configured to transfer energy to a tire and including both an engine and an electric machine. The vehicle also includes a controller configured to charge a traction battery with torque captured by the electric machine in excess of torque required to maintain the departure. The charging is in response to indication of departure from static friction between the tire and a surface during a line lock tire slip event powered by the engine.

17 Claims, 4 Drawing Sheets

(56) References Cited

U.S. PATENT DOCUMENTS

| | | | | |
|---|---|---|---|---|
| 5,954,406 A * | 9/1999 | Sawada | | B60T 7/12 |
| | | | | 303/10 |
| 6,406,103 B1 * | 6/2002 | Elliott | | B60T 1/02 |
| | | | | 303/20 |
| 7,878,053 B2 * | 2/2011 | Lehner | | B60T 17/221 |
| | | | | 73/121 |
| 8,175,785 B2 * | 5/2012 | Turski | | B60T 8/175 |
| | | | | 180/197 |
| 8,297,717 B2 * | 10/2012 | Mlynarczyk | | B60T 8/175 |
| | | | | 303/20 |
| 8,706,378 B2 * | 4/2014 | Choby | | B60T 8/172 |
| | | | | 180/197 |
| 9,174,616 B2 * | 11/2015 | Taylor | | B60T 13/662 |
| 9,616,867 B2 * | 4/2017 | Lamb | | B60T 11/105 |
| 9,656,546 B2 * | 5/2017 | Morrissett | | B60K 20/02 |
| 9,731,721 B1 * | 8/2017 | Wilder | | B60T 8/175 |
| 9,764,609 B2 * | 9/2017 | Handzel, Jr. | | B60C 99/003 |
| 9,855,813 B2 * | 1/2018 | Mohamed | | B60G 17/0164 |
| 2001/0039230 A1 * | 11/2001 | Severinsky | | B60H 1/004 |
| | | | | 477/3 |
| 2003/0130078 A1 * | 7/2003 | Aikawa | | F16H 61/061 |
| | | | | 475/116 |
| 2005/0080547 A1 * | 4/2005 | Scelers | | B60K 28/16 |
| | | | | 701/82 |
| 2005/0102087 A1 * | 5/2005 | Sawada | | B60K 28/16 |
| | | | | 701/82 |
| 2005/0283298 A1 * | 12/2005 | Ochi | | B60W 10/02 |
| | | | | 701/67 |
| 2006/0196712 A1 * | 9/2006 | Toyota | | B60K 6/445 |
| | | | | 180/165 |
| 2007/0096557 A1 * | 5/2007 | Tamai | | B60T 7/122 |
| | | | | 303/191 |
| 2008/0015761 A1 * | 1/2008 | Bellego | | B60T 13/74 |
| | | | | 701/70 |
| 2009/0112437 A1 * | 4/2009 | Luehrsen | | B60T 8/175 |
| | | | | 701/84 |
| 2011/0172889 A1 * | 7/2011 | Zhang | | B60K 23/06 |
| | | | | 701/54 |
| 2011/0175438 A1 * | 7/2011 | Mlynarczyk | | B60T 8/175 |
| | | | | 303/20 |
| 2011/0175439 A1 * | 7/2011 | Mlynarczyk | | B60T 8/175 |
| | | | | 303/20 |
| 2013/0073166 A1 * | 3/2013 | Sollart | | B60K 28/16 |
| | | | | 701/84 |
| 2013/0289810 A1 * | 10/2013 | Holmes | | B60K 6/24 |
| | | | | 701/22 |
| 2014/0129107 A1 * | 5/2014 | Taylor | | B60T 13/662 |
| | | | | 701/70 |
| 2015/0120106 A1 * | 4/2015 | Yu | | B60W 10/18 |
| | | | | 701/22 |
| 2015/0300312 A1 * | 10/2015 | Ferguson | | F02P 5/15 |
| | | | | 123/406.12 |
| 2016/0159187 A1 * | 6/2016 | Mohamed | | B60G 17/0164 |
| | | | | 701/37 |
| 2019/0035174 A1 * | 1/2019 | Pfeiffer | | G07C 5/0808 |

* cited by examiner

POWER CAPTURE DURING A LINE LOCK EVENT

TECHNICAL FIELD

The present disclosure relates to power capture during a line lock event.

BACKGROUND

In drag racing, or other vehicular racing events, many factors contribute to the outcome of the event. Two important factors are the power available to the driver, which may include electrical power stored in the battery for hybrid electric powertrains, and the traction between the tires and the contact surface. Drivers may employ a line lock to engage the front brakes and open the throttle to spin the rear tires against the contact surface. Spinning the tires warms them and increases contact surface traction.

SUMMARY

A vehicle includes a powertrain configured to transfer energy to a tire and including both an engine and an electric machine. The vehicle also includes a controller configured to charge a traction battery with torque captured by the electric machine in excess of torque required to maintain the departure. The charging is in response to indication of departure from static friction between the tire and a surface during a line lock tire slip event powered by the engine.

A vehicle includes a powertrain configured to transfer energy to a tire and including an internal combustion engine. The vehicle also includes a controller configured to store energy in excess of torque required to maintain the departure in an energy storage device. The energy storage is in response to indication of departure from static friction between the tire and a surface during a line lock tire slip event powered by the engine.

A vehicle includes a front wheel assembly including a brake. The vehicle includes a rear traction wheel assembly having a tire and being coupled to a powertrain having an engine and an electric machine. The vehicle also includes a controller configured to engage the electric machine with the powertrain to charge a traction battery such that a speed of the tire is reduced and the slippage is maintained. The engagement is in response to acceleration of the engine causing slippage of the tire during a line lock event of the brake.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A line lock is an engagement of at least one brake of a vehicle to prevent lateral movement of the vehicle during a burnout or wheel spin event. The accelerator pedal or other acceleration control method is used to apply power to at least one of the wheels such that the wheel departs from static friction. The departure from static friction warms the wheels because of kinetic friction between the tire of the wheel assembly and a contact surface (e.g., concrete, asphalt). Warmed tires typically have increased traction.

Static friction is the frictional force between the tire and a surface, such as a road or track, without a change in position. Meaning, static friction occurs before the wheel assembly begins to spin. The frictional force between the tire and the contact surface after the wheel assembly spins is called kinetic friction, dynamic, or sliding friction. Typically, static friction is greater than kinetic friction when the materials in contact are tires of a vehicle and a road surface. Therefore, an engine must overcome the static friction present in order to spin the unlocked wheel or wheels. The departure from static friction may be measured using various methods. One method is to monitor the wheel speed or angular velocity of the wheel. If the angular velocity is more than zero, the wheel is moving. Another is to monitor acceleration of the wheel. The rate of change of the wheel speed may provide an indication of a departure from static friction. Also, a torque measurement may provide an indication of the departure. If the vehicle weight and coefficient of friction are known, a controller may be configured to determine the departure based on the force applied.

Any torque generating device on the powertrain may provide the torque necessary to depart from static friction or begin the tire slip event. For example, the engine may provide the torque necessary for the departure and maintain the accelerator or throttle in the open position after the departure. The electric machine or another capture device may also provide torque necessary for the departure in other embodiments.

After the departure or during the tire slip event, the powertrain controller may engage or repurpose an energy capture and storage device. For example, an electric machine may be configured to add negative torque to the powertrain through the power electronics. A flywheel may be engaged to add negative torque to the powertrain as well. The powertrain controller may be configured to maintain the departure. The departure from static friction may be maintained by maintaining the angular velocity of the wheel above a threshold. Acceleration may also be used to ensure the departure is maintained. Additionally, torque sensors at each wheel can ensure that torque applied to each of the wheels is above the kinetic friction of the tire and surface by subtracting the torque applied at the wheel from the torque received at the wheel. A series of mathematical algorithms may be used to calculate the torque received at the wheel, which may include a mass or weight constant. The torque received at the wheel may be a function of the speed of the wheel assembly.

Figure 1:
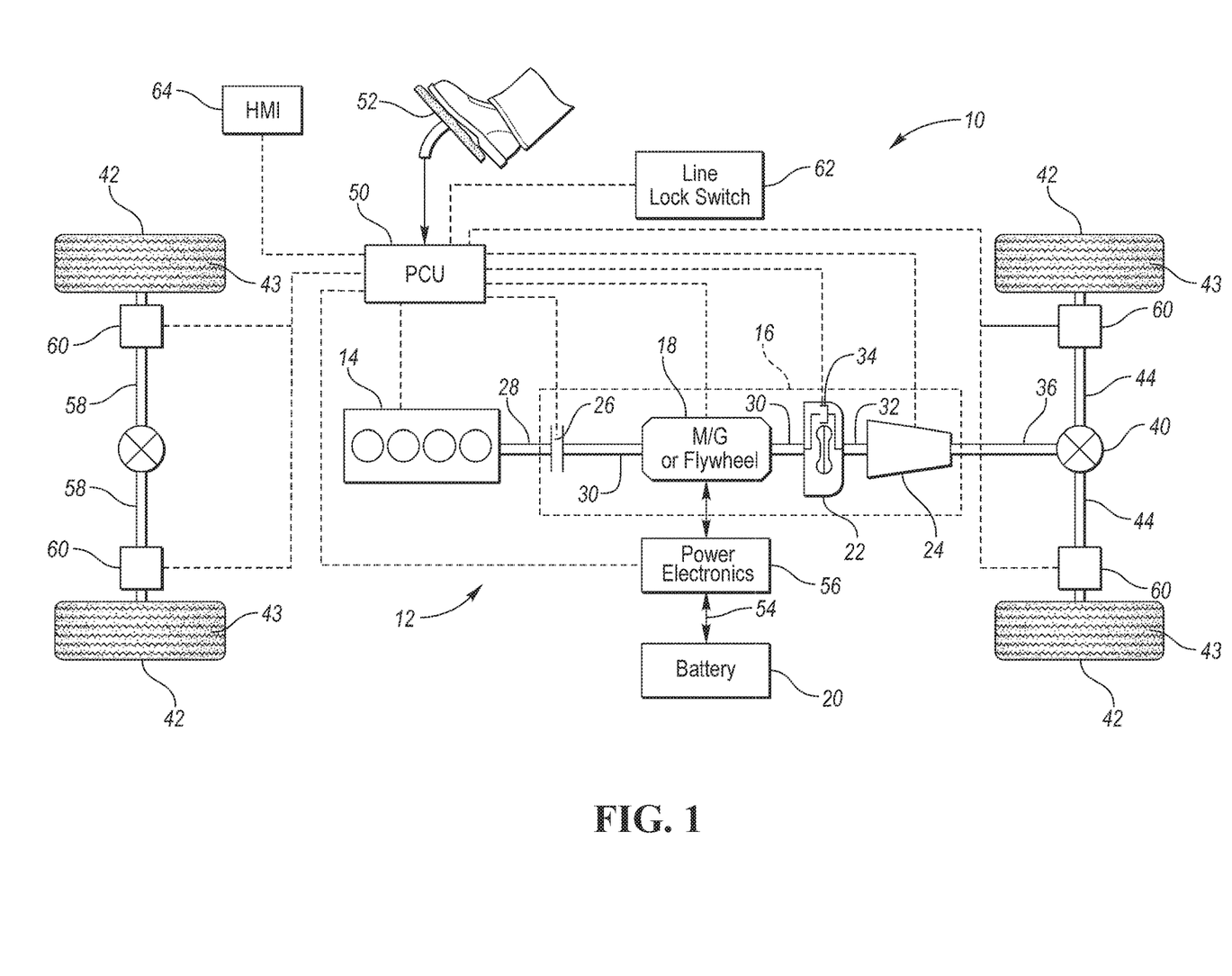
FIG. 1 is a diagrammatic view of a vehicle including an energy capture and storage device.
Figure 2A:
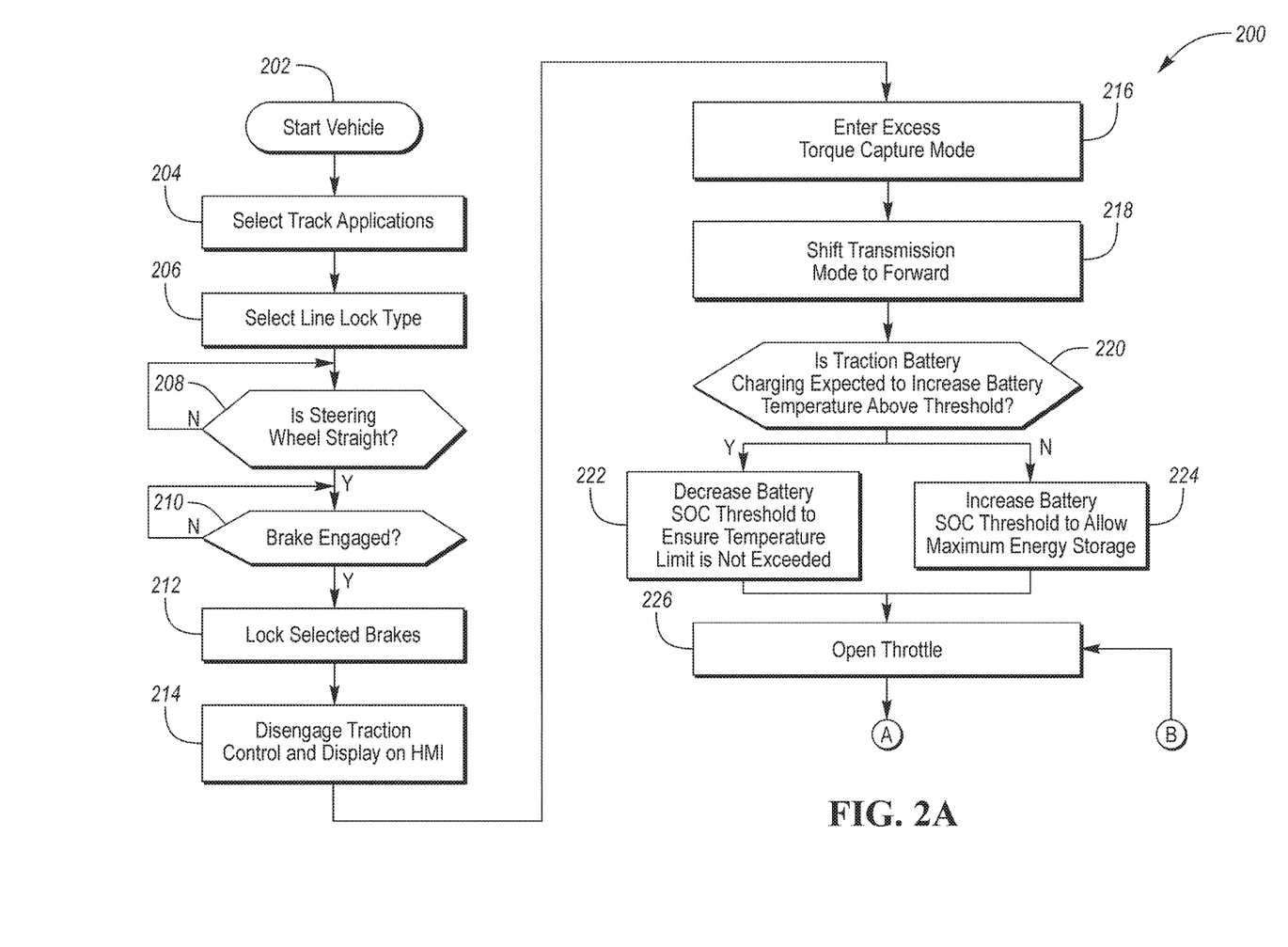
FIG. 2A is a flow diagram of a line lock event including energy capture and storage.
Figure 2B:
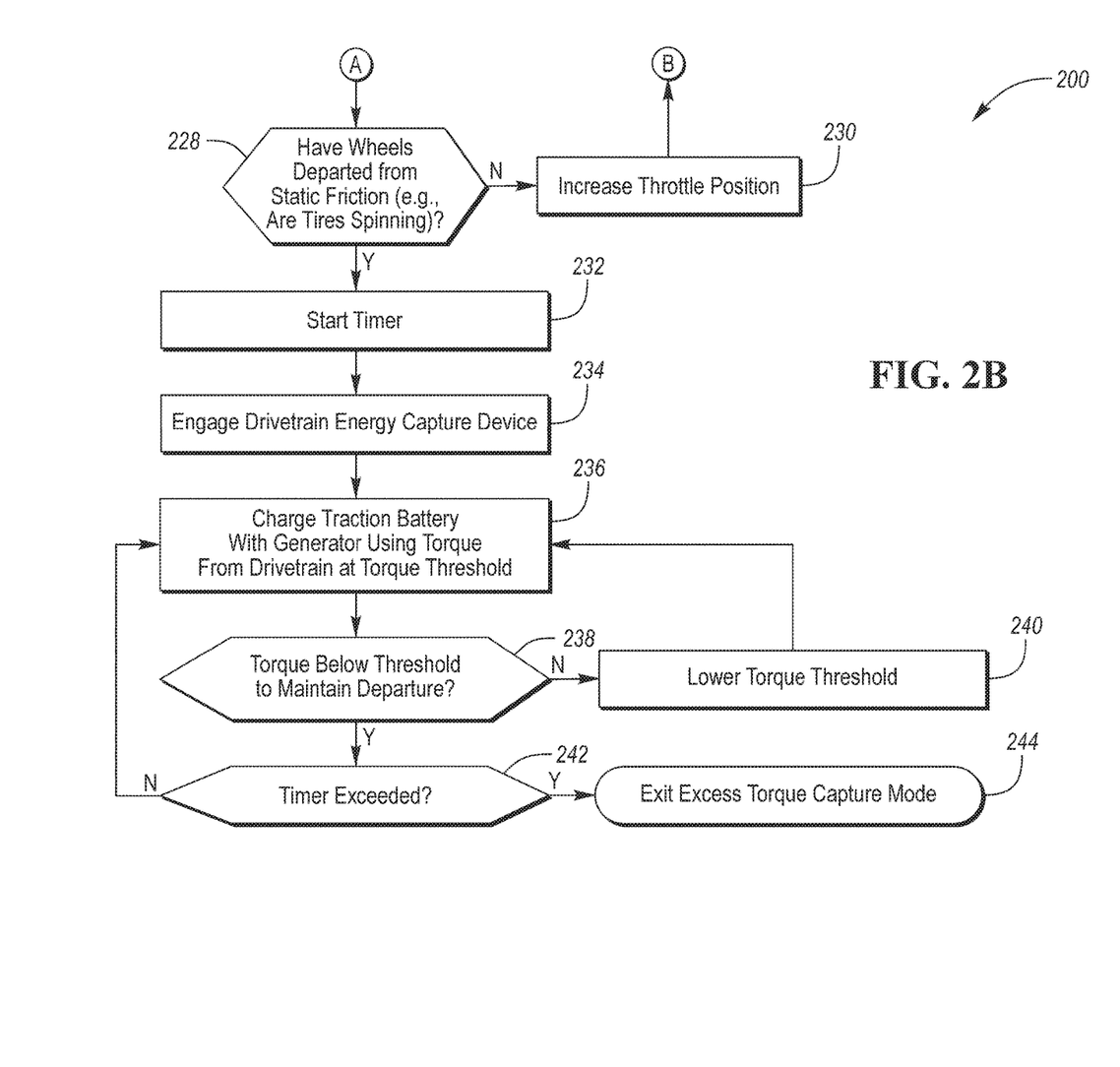
FIG. 2B is a flow diagram of a line lock event including energy capture and storage.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain or drivetrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery, capacitor bank, or energy storage device 20, a torque converter 22, and a multiple step-ratio automatic transmission, or gearbox 24. In other embodiments, as shown in FIG. 2, the M/G 18 and associated traction battery 20 may be an entirely mechanical power capture and storage device. For example, M/G 18 may be replaced by a flywheel. The flywheel may capture and release energy onto the powertrain 12 similar to the M/G 18. The flywheel may also be controlled by the PCU 50. The flywheel may have a similar clutch configuration to engage and disengage. Any combination of energy capture devices may be used including both an M/G 18 or a flywheel. Multiple devices may be used in combination. Any combination of energy storage devices or combination thereof may be used.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics 56 condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch. The M/G 18 or energy capture device can be located anywhere on the drivetrain, powertrain, or axles to capture excess energy. For example, the M/G 18 may be located on the differential or independent suspension axles.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU) 50. The gearbox 24 then provides powertrain output torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 having tires 43 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated powertrain control unit (PCU) 50. While illustrated as one controller, the PCU 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, PCU 50 may communicate signals to and/or from engine 14, disconnect clutch 26, M/G 18, launch clutch 34, transmission gearbox 24, and power electronics 56. Although not explicitly illustrated, those of ordinary skill in the art will recognize various functions or components that may be controlled by PCU 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), for example.

Control logic or functions performed by PCU 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as PCU 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the pedal 52 generates an accelerator pedal position signal that may be interpreted by the controller 50 as a demand for increased power or decreased power, respectively. The torque demand may be additionally provided by an algorithm elicited by a line lock request or selected menu option. Based at least upon input from the pedal 52, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The PCU 50 commands the power electronics 56 to convert voltage from the battery 20 to an AC voltage provided to the M/G 18 to provide positive or negative torque to the shaft 30. This operation mode may be referred to as an "electric only" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20.

The vehicle 10 may include two sets of axles 44, 58. One or all of the axles 44, 58 may include brakes 60. Actuation of the brakes 60 is selectable by the PCU 50 and may be driven by solenoids or other actuation mechanisms. The brakes 60 may be additionally actuated by a driver pedal or other method (not shown).

A line lock switch 62 may be available to the driver on the dashboard or through a human-machine interface ("HMI") screen 64. The line lock switch 62 allows the driver or passenger to select the particular wheel or wheels to be line locked. A line lock, as is known in the art is a selectable engagement of a brake or set of brakes to prevent lateral movement of the vehicle 10 during a burnout or wheel spin.

It should be understood that the schematic illustrated in FIG. 1 is merely exemplary and is not intended to be limited. Other configurations are contemplated that utilize selective engagement of both an engine and a motor to transmit through the transmission. For example, the M/G 18 may be offset from the crankshaft 28, an additional motor may be provided to start the engine 14, and/or the M/G 18 may be provided between the torque converter 22 and the gearbox 24. Additionally, a power-split or other hybrid configuration is contemplated by this disclosure. Any hybrid or non-hybrid configuration may incorporate the teachings of this disclosure. None of the components disclosed are essential, and an electric machine or engine is not required. Other configurations are contemplated without deviating from the scope of the present disclosure.

Referring to FIG. 2, a flow diagram 200 of a line lock tire slip event is shown. Operation 202 starts the algorithm. A driver may select a menu item entitled "Track Applications" from the HMI 64 in operation 204. Operation 206 allows a user to select the desired line lock type. For example, a user may lock the front wheel of a tricycle, the front wheels 42 of a rear wheel drive vehicle, the rear wheels 42 of a front wheel drive vehicle, or any combination or partial combination thereof. Physical switches may be provided for line lock selections instead of an HMI 64.

Operation 208 checks whether the steering wheel is straight in case acceleration is applied immediately following the line lock event. Operation 210 checks whether the brake pedal is depressed or the brakes 60 are otherwise engaged or commanded to be engaged. The controller 50 may be configured to wait until the user does not command the brakes 60 to be engaged such that the controller 50 can autonomously engage the brakes 60 in operation 212. Operation 214 disengages enabled traction or slip controls and displays the status on the HMI 64 for the driver. Operation 216 puts the vehicle in excess torque capture mode. Operation 218 shifts the transmission into a forward mode.

Decision point 220 determines, as an example, whether the traction battery 20 charging is expected to increase battery temperature above a threshold. The threshold does not need to relate to a temperature of the energy storage device and can be any maximum value (e.g., pressure, speed, torque, current, voltage, force). The threshold may be particular to the energy storage device (e.g., electric machine, flywheel) used. For example, a flywheel may have physical thresholds requiring prediction prior to the energy capture to ensure safety margins are not exceeded (e.g., expected force to be captured, expected flywheel speed). A traction battery 20 may have physical thresholds requiring prediction as well. A traction battery 20 may have maximum temperature threshold to ensure the energy capture event does not exceed the requirements. The controller 50 may decrease the battery SOC threshold to ensure the temperature limit is not exceeded in operation 222. The controller 50 may also estimate the time to reach the SOC threshold and adjust the timer accordingly. If the battery 20 temperature is not predicted to be exceeded in operation 230, the controller 50 may increase the battery 20 SOC threshold in operation 224 such that the battery retains more energy. The additional energy can be expended during the drag race or other racing event to increase the power available to the driver. The SOC of the battery 20 may be increased irrespective of the temperature if determined impertinent. For example, the battery 20 or flywheel energy storage capacity may be increased whenever a line lock event is performed to increase powertrain output following the event.

Operation 226 opens the throttle or accelerator pedal 52, which may be a mechanical, electromechanical, or electronic device. Decision point 228 determines whether the wheels 42 have departed from static friction and recognizes that the tires or wheels 42 are spinning. If the wheels 42 have not departed from static friction, algorithm increases the throttle position or setpoint in operation 230. The throttle may be gradually increased with a ramp rate, step increased according to an overall ramp rate, or operated at maximum from the beginning.

As mentioned above, the departure from static friction may be detected in a variety of ways. A straightforward approach includes monitoring the speed of the wheel. As soon as the wheel moves a departure occurs. Another approach includes the acceleration of the wheel or a combination of the acceleration and the speed. Applied wheel torque may be used to determine a departure or an expected departure when the weight of the vehicle and the static coefficient of friction is known.

Operation 232 starts a timer to limit the tire slip duration. Excessive tire slip can cause tire ruptures or overheating. The timer may be configured by a user based on the tires used or set by the manufacturer. If not already engaged, the energy capture device 18 is engaged in operation 234 after the wheels 42 have departed from static friction. The timer 232 may also be a counter or other incremental unit to prevent overuse of the line lock event that governs the amount of tire warming required.

Operation 236 charges the traction battery 20 with the generator 18 or energy capture device using excess torque from the powertrain 12. The excess energy may be stored in the battery 20 or another energy storage device. In order to ensure the departure from static friction is maintained, decision point 238 checks whether torque drawn from the powertrain 12 is too high or the speed of the wheel spin is too low. The torque threshold may be dynamically adjusted to ensure the departure is maintained and the wheel is always spinning. The throttle of step 226 may be further increased to ensure the maximum battery 20 SOC is achieved or the required energy is captured and the departure is maintained. The energy capture process may exit if the storage device is at capacity before the tires are fully warm or before the timer completes. In such a case, the engine may continue to spin and warm the tires without energy capture. Energy capture is performed until the timer is exceeded in operation 242. The timer may be dynamically adjusted to ensure ample energy is captured. Operation 244 exits the energy capture mode when the timer lapses.

Figure 3:
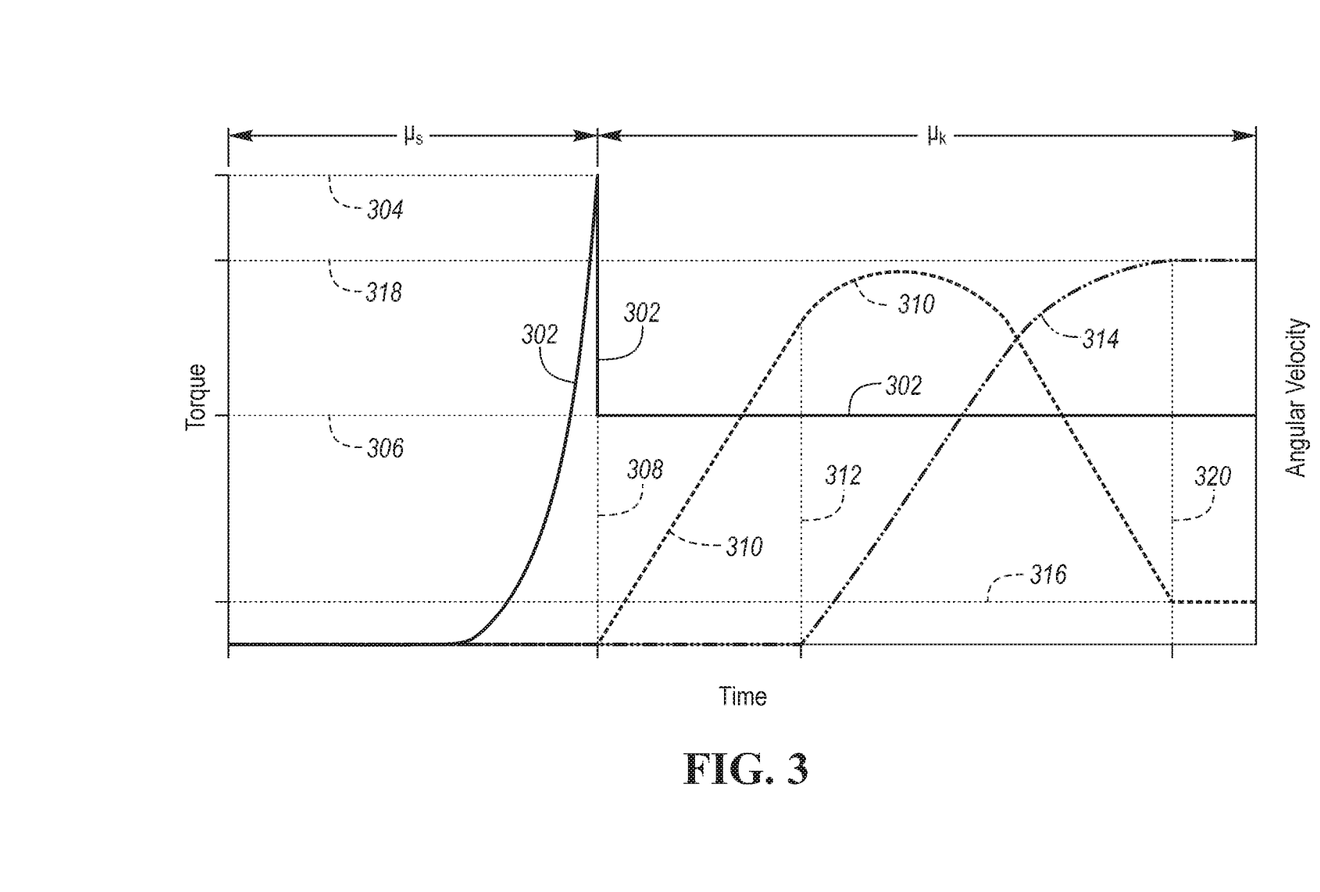
FIG. 3 is a graph of powertrain torque, capture device torque, and angular velocity of a wheel of the vehicle.

Referring to FIG. 3, a graph 300 of powertrain torque, capture device torque, and angular velocity of a wheel of the vehicle is shown. A frictional force curve 302 is shown. The frictional force curve 302 has a static friction maximum or limit 304 that builds as force is applied to the wheel. Once the frictional force curve 302 departs from static friction at line 308 the frictional force curve 302 drops to the kinetic or dynamic friction magnitude 306. The wheel 42 spins once the departure occurs and the force required to maintain the departure may be greater than or equal to the dynamic friction magnitude 306. The angular velocity curve 310 indicates the time when the wheel begins to spin. As the wheel spins and increases angular velocity, an M/G 18 may be connected, as shown at line 312, where the angular velocity curve 310 rate of change begins to decrease and the capture device torque curve 314 begins to increase. The torque curve 314 may be limited to a non-arbitrary value 318 based on the maximum torque available to be captured before the wheel stops or begins to stop. The angular velocity curve 310 may have a minimum speed or velocity predetermined threshold 316 which is reached at the same time the torque curve 314 maximum threshold 318 is reached at time 320. Before or after the line lock event the engine may directly charge the traction battery 20 or energy storage device without spinning the wheels to ensure the battery 20 is fully charged.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
    a powertrain configured to transfer energy to a tire and including both an engine and an electric machine; and
    a controller configured to, in response to indication of departure from static friction between the tire and a surface during a line lock tire slip event powered by the engine, charge a traction battery with torque captured by the electric machine in excess of torque required to maintain the departure and maintain an angular velocity of the tire above a threshold during the line lock tire slip event.

2. The vehicle of claim 1, wherein the departure from static friction is based on an angular velocity of the tire.

3. The vehicle of claim 1, wherein the departure from static friction is further based on a rate of change of an angular velocity of the tire.

4. The vehicle of claim 1, wherein the energy is based on an angular velocity of the tire.

5. A vehicle comprising:
    a powertrain configured to transfer energy to a tire and including an internal combustion engine; and
    a controller configured to, in response to indication of departure from static friction between the tire and a surface during a line lock tire slip event powered by the engine, store energy, that is based on an angular velocity of the tire, in excess of torque required to maintain the departure in an energy storage device and maintain the angular velocity above a threshold during the line lock tire slip event.

6. The vehicle of claim 5, wherein the departure from static friction is based on a speed of the tire.

7. The vehicle of claim 5, wherein the departure from static friction is further based on a rate of change of a speed of the tire.

8. The vehicle of claim 5, wherein the energy is based on a speed of the tire.

9. The vehicle of claim 5, wherein the energy is based on a rate of change of a speed of the tire.

10. The vehicle of claim 5, wherein the powertrain further includes an electric machine.

11. The vehicle of claim 5, wherein the energy storage device is a battery having a normal battery state of charge threshold set by the controller.

12. The vehicle of claim 11, wherein the controller is further configured to increase the normal battery state of charge threshold to a line lock battery state of charge threshold in response to initiation of the line lock tire slip event.

13. The vehicle of claim 5, wherein the energy storage device is a capacitor.

14. The vehicle of claim 5, wherein the energy storage device is a flywheel.

15. A vehicle comprising:
    a front wheel assembly including a brake;
    a rear traction wheel assembly having a tire and being coupled to a powertrain having an engine and an electric machine; and
    a controller configured to, in response to acceleration of the engine causing slippage of the tire during a line lock event of the brake, engage the electric machine with the powertrain to charge a traction battery such that a speed of the tire is reduced and the slippage is maintained.

16. The vehicle of claim 15, wherein the speed is reduced to a predetermined threshold.

17. The vehicle of claim 15, wherein the traction battery has a maximum state of charge that is increased during the line lock event.

\* \* \* \* \*